United States Patent
Kim et al.

(10) Patent No.: US 10,260,577 B2
(45) Date of Patent: Apr. 16, 2019

(54) VEHICLE LAUNCH CONTROL METHOD

(71) Applicant: Hyundai Motor Company, Seoul (KR)

(72) Inventors: Jin Sung Kim, Hwaseong-si (KR); Ju Hyun Nam, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 81 days.

(21) Appl. No.: 15/372,107

(22) Filed: Dec. 7, 2016

(65) Prior Publication Data

US 2018/0073577 A1    Mar. 15, 2018

(30) Foreign Application Priority Data

Sep. 12, 2016  (KR) .......................... 10-2016-0117436

(51) Int. Cl.
*F16D 48/08*  (2006.01)
*F16D 48/06*  (2006.01)

(52) U.S. Cl.
CPC .... *F16D 48/08* (2013.01); *F16D 2500/10412* (2013.01); *F16D 2500/3065* (2013.01); *F16D 2500/3067* (2013.01); *F16D 2500/3068* (2013.01); *F16D 2500/30421* (2013.01); *F16D 2500/3144* (2013.01); *F16D 2500/3165* (2013.01); *F16D 2500/31446* (2013.01);
(Continued)

(58) Field of Classification Search
CPC ..................... F16D 48/06; F16D 48/08; F16D 2500/10412; F16D 2500/3065; F16D 2500/3067; F16D 2500/3068; F16D 2500/3144; F16D 2500/3165; F16D 2500/50244; F16D 2500/70247; F16D 2500/7044; F16D 2500/7061; F16D 2500/70631; F16D 2500/70615
See application file for complete search history.

(56) References Cited

U.S. PATENT DOCUMENTS 5,679,099 A * 10/1997 Kato ..................... F16D 48/066
                                                            477/176
7,222,011 B2 * 5/2007 Smith ................... B60W 10/02
                                                             192/3.51
(Continued)

FOREIGN PATENT DOCUMENTS

JP        2002-031168 A      1/2002
JP        3334442 B2         10/2002
(Continued)

*Primary Examiner* — David R Morris
(74) *Attorney, Agent, or Firm* — Morgan, Lewis & Bockius LLP

(57) ABSTRACT

A vehicle launch control method may include judging, by a controller, whether or not a vehicle starts to be launched, determining, by the controller, target clutch torque through a designated first determination method and controlling a clutch based on the determined target clutch torque, upon judging that the vehicle starts to be launched, and determining, by the controller, target clutch torque through a designated second determination method differing from the first determination method and controlling the clutch based on the determined target clutch torque, when an engine speed variation and engine speed jerk respectively satisfy designated variation conditions and jerk conditions during determination of the target clutch torque through the first determination method and control of the clutch based on the determined target clutch torque.

7 Claims, 4 Drawing Sheets

(52) U.S. Cl.
  CPC ........... *F16D 2500/5046* (2013.01); *F16D 2500/50224* (2013.01); *F16D 2500/5122* (2013.01); *F16D 2500/7044* (2013.01); *F16D 2500/7061* (2013.01); *F16D 2500/70247* (2013.01); *F16D 2500/70408* (2013.01); *F16D 2500/70631* (2013.01)

(56) References Cited

U.S. PATENT DOCUMENTS

| | | | |
|---|---|---|---|
| 8,996,266 B2* | 3/2015 | Hultengren | F16D 13/00 477/166 |
| 9,663,107 B2* | 5/2017 | Kim | B60W 30/18027 |
| 2006/0020384 A1 | 1/2006 | Smith et al. | |
| 2014/0195129 A1* | 7/2014 | Hultengren | F16D 13/00 701/54 |
| 2017/0096142 A1* | 4/2017 | Kim | B60W 30/18027 |
| 2018/0118184 A1* | 5/2018 | Ruybal | B60W 10/113 |

FOREIGN PATENT DOCUMENTS

| | | |
|---|---|---|
| JP | 2008-075839 A | 4/2008 |
| JP | 5587433 B2 | 9/2014 |
| JP | 5660581 B2 | 1/2015 |
| KR | 10-1997-0061606 | 9/1997 |
| KR | 10-2016-0005251 A | 1/2016 |

* cited by examiner

VEHICLE LAUNCH CONTROL METHOD

CROSS-REFERENCE TO RELATED APPLICATION

The present application claims priority to Korean Patent Application No. 10-2016-0117436, filed on Sep. 12, 2016, the entire contents of which is incorporated herein for all purposes by this reference.

BACKGROUND OF THE INVENTION

Field of the Invention

Various embodiments of the present invention relates to a vehicle launch control method and, more particularly, to a vehicle launch control method in which power of an engine is transmitted to a transmission through a dry clutch.

Description of Related Art

Among vehicles provided with an automated manual transmission (AMT) or a dual clutch transmission (DCT), there are vehicles in which power of an engine is transmitted to a transmission through a dry clutch (hereinafter, referred to simply as a "clutch").

In such a vehicle, when the vehicle is launched by manipulating an accelerator pedal by a driver, a controller to control a transmission connects a clutch regarding launch to an engine with reference to engine torque according to the manipulated quantity of an accelerator pedal by the driver, so that the vehicle is started and, at this time, if clutch torque to connect the clutch to the engine is not properly controlled, rattling of the vehicle or impact occurs.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle launch control method in which, when a vehicle provided with a dry clutch is launched, clutch torque is properly controlled to prevent the vehicle from rattling and to smoothly launch the vehicle.

Various aspects of the present invention are directed to providing the above and other objects can be accomplished by the provision of a vehicle launch control method including judging, by a controller, whether or not a vehicle starts to be launched, determining, by the controller, target clutch torque through a designated first determination method and controlling a clutch based on the determined target clutch torque, upon judging that the vehicle starts to be launched, and determining, by the controller, target clutch torque through a designated second determination method differing from the first determination method and controlling the clutch based on the determined target clutch torque, when an engine speed variation and engine speed jerk respectively satisfy designated variation conditions and jerk conditions during determination of the target clutch torque through the first determination method and control of the clutch based on the determined target clutch torque.

In the first determination method, the target clutch torque may be determined using a variation of clutch launch target torque per control cycle, acquired by adding a feed-forward component, based on a target engine speed variation determined according to the manipulated quantity of an accelerator pedal by a driver, and a feedback component, based on a target engine speed determined according to the manipulated quantity of the accelerator pedal, as an increment of the target clutch torque per control cycle.

The feed-forward component of the clutch launch target torque may be acquired by subtracting a value, acquired by multiplying a target engine speed variation output from a map, representing target engine speed variations according to manipulated quantities of the accelerator pedal by the driver, by moment of rotational inertia of an engine driving system, from engine torque, and the feedback component of the clutch launch target torque may be acquired by multiplying a difference between a target engine speed output from a map, representing target engine speeds according to manipulated quantities of the accelerator pedal by the driver, and an actually measured engine speed by a designated gain.

The variation of the clutch launch target torque per control cycle used as the increment of the target clutch torque per control cycle may be restricted to a designated limit value.

In the second determination method, the target clutch torque may be determined using a difference between clutch launch target torque, determined through the same method as the first determination method, and target clutch torque in the previous control cycle as an increment of the target clutch torque per control cycle.

The variation conditions serving as a criterion for judgment of the engine speed variation and the jerk conditions serving as a criterion for judgment of the engine speed jerk may be respectively set to values to judge that the transient state of the engine according to manipulation of the accelerator pedal by the driver is terminated.

Determination of the target clutch torque through the second determination method and control of the clutch based on the determined target clutch torque may be continued until termination of launch of the vehicle can be confirmed.

In accordance with another aspect of the present invention, there is provided a control apparatus to implement a vehicle launch control method, including a target engine speed variation map configured to receive the manipulated quantity of an accelerator pedal and then to output a target engine speed variation, a target engine speed map configured to receive the manipulated quantity of the accelerator pedal and then to output a target engine speed, a feed-forward determination unit configured to determine a feed-forward component by subtracting a value, acquired by multiplying the output value from the target engine speed variation map by moment of rotational inertia of an engine driving system, from engine torque, a feedback determination unit configured to determine a feedback component by multiplying a difference between the output value from the target engine speed map and an actually measured engine speed by a gain, a launch target torque determination unit configured to determine clutch launch target torque by adding the feed-forward component from the feed-forward determination unit and the feedback component from the feedback determination unit, a first unit delay configured to store a value of the clutch launch target torque in the previous control cycle, output from the launch target torque determination unit, the rate limiter configured to determine a difference between the clutch launch target torque output from the launch target torque determination unit and the clutch launch target torque in the previous control cycle provided by the first unit delay and to output the difference restricted so as not to exceed a designated limit value, a second unit delay configured to store target clutch torque in the previous control cycle, and a target clutch torque determination unit configured to determine target clutch torque used in the current control cycle by adding the output value from the rate limiter to the target clutch torque in the previous control cycle provided by the second unit delay.

The vehicle launch control apparatus may further include a condition judgment unit configured to output a signal to substitute the output value from the second unit delay for the output value from the first unit delay, when an engine speed variation satisfies designated variation conditions and engine speed jerk satisfies designated jerk conditions, and the first unit delay may be configured to output the stored clutch launch target torque in the previous control cycle before the first unit delay receives the signal from the condition judgment unit, and then to output the target clutch torque in the previous cycle provided by the second unit delay after the first unit delay receives the signal from the condition judgment unit.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
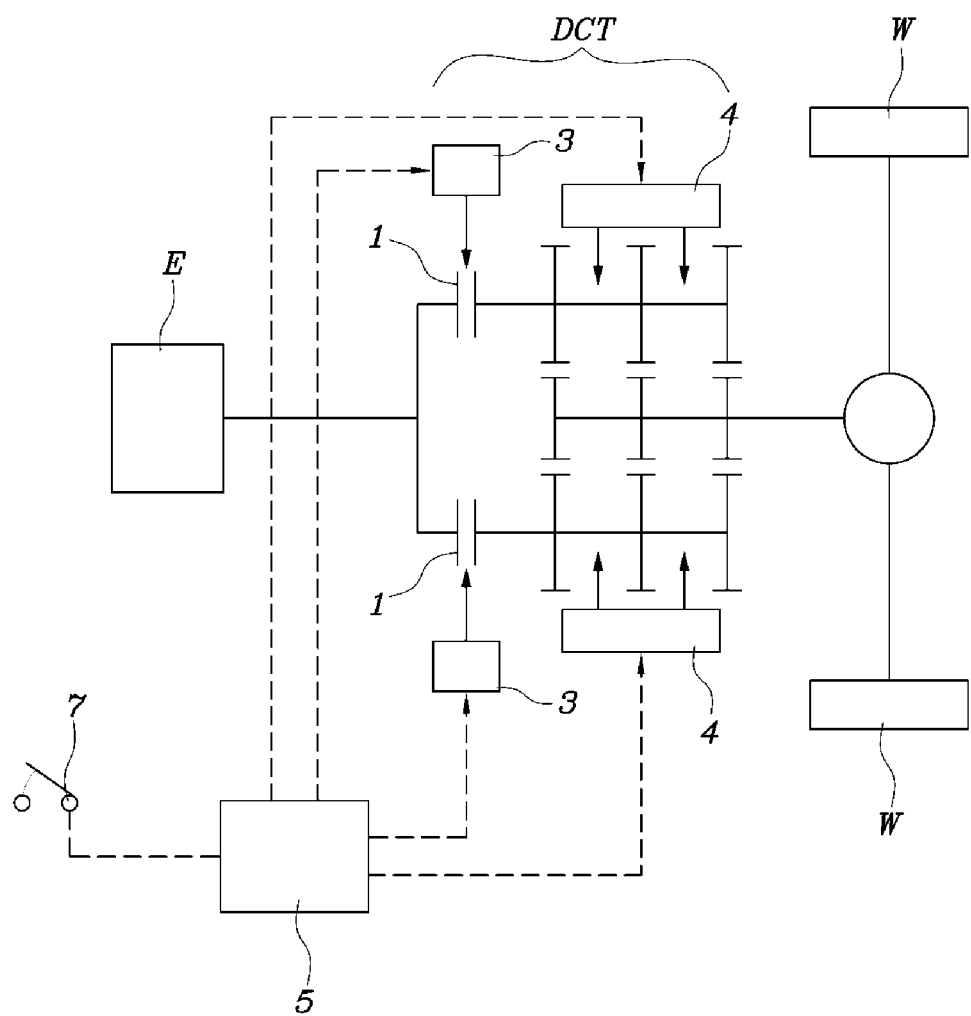
FIG. 1 is a view exemplarily illustrating the configuration of a vehicle provided with a DCT, to which a vehicle launch control method in accordance with the present invention is applicable.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

With reference to FIG. 1, an engine E is configured such that power of the engine E is provided to drive wheels through a dual clutch transmission (DCT), two clutches 1 of the DCT are controlled by clutch actuators 3, transmission between transmission gears forming respective transmission positions is carried out by transmission actuators 4, which selectively operate synchronizers, the clutch actuators 3 and the transmission actuators 4 are controlled by a controller 5, and the controller 5 is configured to receive a signal from an accelerator position sensor (APS) 7 to receive the manipulated quantity of an accelerator pedal.

Of course, the controller 5 is configured to receive information including engine torque, engine speed, etc.

Figure 2:
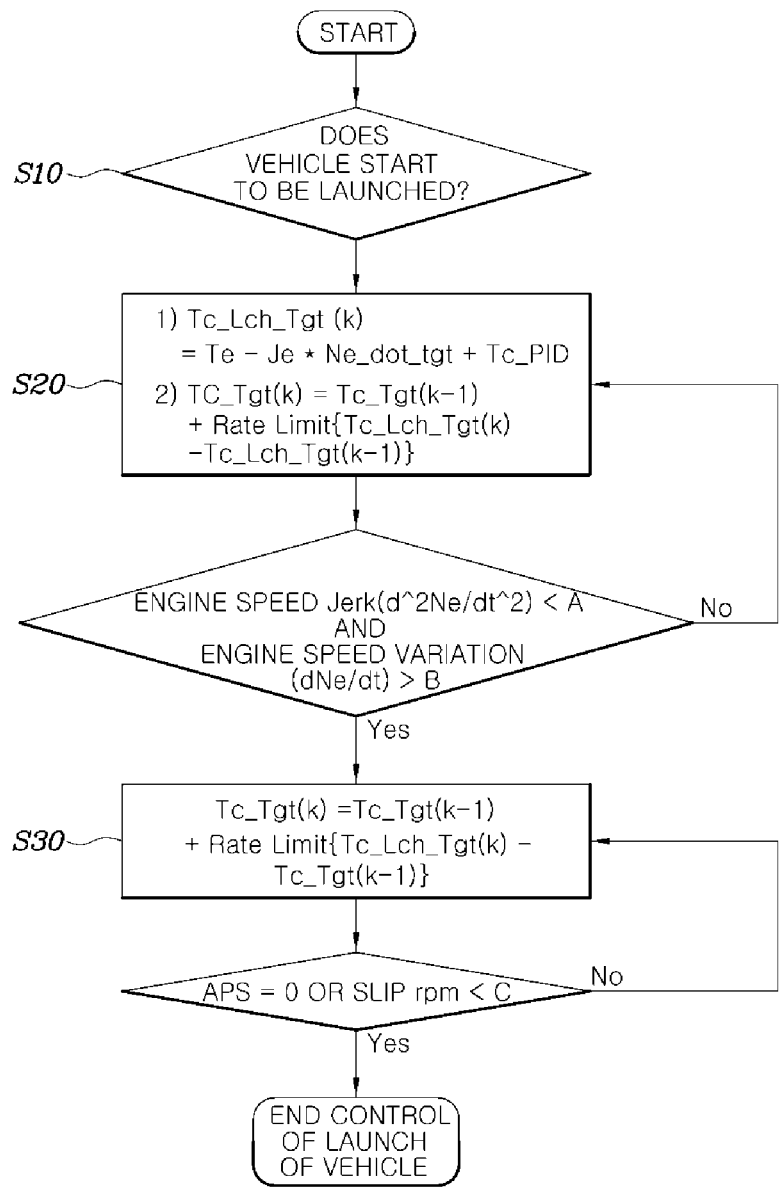
FIG. 2 is a flowchart illustrating a vehicle launch control method in accordance with one exemplary embodiment of the present invention.

For reference, marks used in FIG. 2, FIG. 3 and FIG. 4 will be described as below.

Tc_Lch_Tgt: clutch launch target torque
Tc_Tgt: target clutch torque
APS: APS signal (manipulated quantity of accelerator pedal)
Te: engine torque
Je: moment of rotational inertia of engine driving system
Ne: engine speed
Ne_Tgt: target engine speed
Ne_dot_tgt: target engine speed variation
Tc_PID: PID feedback control value of engine speed
k: control cycle With reference to FIG. 2, a vehicle launch control method in accordance with one exemplary embodiment of the present invention includes judging, by a controller, whether or not a vehicle starts to be launched (Operation S10), determining, by the controller, target clutch torque through a designated first determination method and controlling a clutch based on the determined target clutch torque, upon judging that the vehicle starts to be launched (Operation S20), and determining, by the controller, target clutch torque through a designated second determination method differing from the first determination method and controlling the clutch based on the determined target clutch torque, when an engine speed variation and engine speed jerk respectively satisfy designated variation conditions and jerk conditions during Operation S20 (Operation S30).

That is, in an exemplary embodiment of the present invention, when the vehicle is launched, a launch control process is divided into first launch operation (Operation S20) and second launch operation (Operation S30) according to engine speed variations and engine speed jerk variations, the target clutch torque determined through the first determination method is used to control a clutch related to launch of the vehicle in first launch operation (Operation S20), and the target clutch torque determined through the second determination method is used to control the clutch until termination of launch of the vehicle can be confirmed in second launch operation (Operation S30), completing the launch control process.

The variation conditions serving as a criterion for judgment of the engine speed variation and the jerk conditions serving as a criterion for judgment of the engine speed jerk are respectively set to values through which it may be judged that the transient state of the engine according to manipulation of the accelerator pedal by a driver is terminated.

That is, when the vehicle starts to be launched by pressing the accelerator pedal by the driver, a torque variation of the engine at the initial stage of launch exhibits a transitional condition. That is, since a comparatively great difference between information regarding engine torque received by the controller and information regarding torque actually output from the engine occurs and torque output from the engine is instable, when the clutch is controlled based on only the information regarding engine torque received by the controller, the engine may rattle or be impacted by a difference between actually applied clutch torque and target clutch torque to be controlled by the controller, in addition to instability of the engine torque, and thus the vehicle may not be smoothly launched. In such a transient state of the engine torque variation, first launch operation (Operation S20) is executed and, thereafter, when it is confirmed that the transient state of the engine torque variation is terminated through the variation conditions and the jerk conditions, second launch operation (Operation S30) is executed, achieving smooth and stable vehicle launch control.

Therefore, the variation conditions and the jerk conditions may be set to levels through which it is confirmed that the transient state of the engine is terminated. For example, as the variation conditions, it is judged that the transient state of the engine is terminated when the engine speed variation exceeds B (for example, 800 to 1,000 RPM/S) and, as the jerk conditions, it is judged that the transient state of the engine is terminated when the engine speed jerk is less than A (for example, −1,000 RPM/S$^2$).

In the first determination method, the target clutch torque (Tc-Tgt) is determined using a variation of clutch launch target torque Tc_Lch_Tgt per control cycle, acquired by adding a feed-forward component, based on a target engine speed variation Ne_dot_tgt determined according to the manipulated quantity of the accelerator pedal (APS) by the driver, and a feedback component, based on a target engine speed (Ne_tgt) determined according to the manipulated quantity of the APS, as an increment of the target clutch torque (Tc-Tgt) per control cycle.

Here, the initial value of the clutch launch target torque and the initial value of the target clutch torque are set to 0 so that the target clutch torque may be gradually increased from 0.

The controller provides the above-determined target clutch torque to the clutch actuator to control the clutch and, by such control of the clutch torque, the speed of the clutch used to launch the vehicle is gradually increased and then synchronized with the speed of the engine when launching of the vehicle is finally completed.

The feed-forward component of the clutch launch target torque (Tc_Lch_Tgt) is acquired by subtracting a value, acquired by multiplying a target engine speed variation (Ne_dot_tgt) output from a map, representing target engine speed variations according to manipulated quantities of the accelerator pedal (APS) by the driver, by moment of rotational inertia of the engine driving system, from engine torque (Te).

The feedback component of the clutch launch target torque (Tc_Lch_Tgt) is acquired by multiplying a difference between a target engine speed (Ne_Tgt) output from a map, representing target engine speeds according to manipulated quantities of the accelerator pedal (APS) by the driver, and an actually measured engine speed by a designated gain.

The above designated gain means a gain of a general PI controller or PID controller, which is conventionally used, and the gain is properly set according to design intention to reduce a difference between the target engine speed and an actually measured engine speed, as is well known.

The variation of the clutch launch target torque per control cycle serving as the increment of the target clutch torque per control cycle is restricted to a designated limit value.

That is, when a value, acquired by subtracting clutch launch target torque in the previous control cycle from clutch launch target torque determined in the current control cycle, is excessively large, target clutch torque in which such a value is reflected is rapidly increased and impact is caused. Therefore, to prevent such a problem, even when the value, acquired by subtracting clutch launch target torque in the previous control cycle from clutch launch target torque determined in the current control cycle, is more than the limit value, the limit value is used as the increment of the target clutch torque so that increase in the target clutch torque does not cause impact or rattling of a powertrain.

Therefore, the limit value may be determined to have a level of the maximum value of clutch torque, which may not cause impact of the powertrain even when it is varied during the time of the control cycle.

In first launch operation (Operation S20) to control the clutch based on the target clutch torque determined through the first determination method, judging from the manipulated quantity of the accelerator pedal by the driver, a variation of clutch launch target torque necessary to achieve a regular launch state, which may be implemented by the vehicle, is restricted to a constant level and is accumulated to serve as target clutch torque and, thus, the target clutch torque to actually control the clutch differs from the clutch launch target torque, but smooth vehicle launch control may be carried out due to stable increase in the target clutch torque without influence of rapid change of the clutch launch target torque according to the transient state of the engine.

In the second determination method, the target clutch torque (Tc-Tgt) is determined using a difference between clutch launch target torque, determined through the same method as the first determination method, and target clutch torque in the previous control cycle as an increment of the target clutch torque (Tc-Tgt) per control cycle.

That is, in second launch operation (Operation S30) to control the clutch based on the target clutch torque determined through the second determination method, since the transient state of the engine is terminated, a difference between the clutch launch target torque necessary to achieve a regular launch state, which may be implemented by the vehicle, and target clutch torque in the previous control cycle k−1 is reflected in target clutch torque used to control the clutch in the current control cycle k, allowing the target clutch torque to track clutch launch target torque and thus exhibiting proper launching performance to be implemented by the vehicle.

Since second launch operation (Operation S30) is continued until termination of launch of the vehicle can be confirmed, second launch operation (Operation S30) is executed until manipulation of the accelerator pedal is released and thus an APS signal becomes 0, the slip quantity of the clutch is less than a designated reference slip quantity C and thus it may be judged that the clutch is almost closed. Here, the reference slip quantity may be set, for example, to approximately 20-50 RPM.

Figure 3:
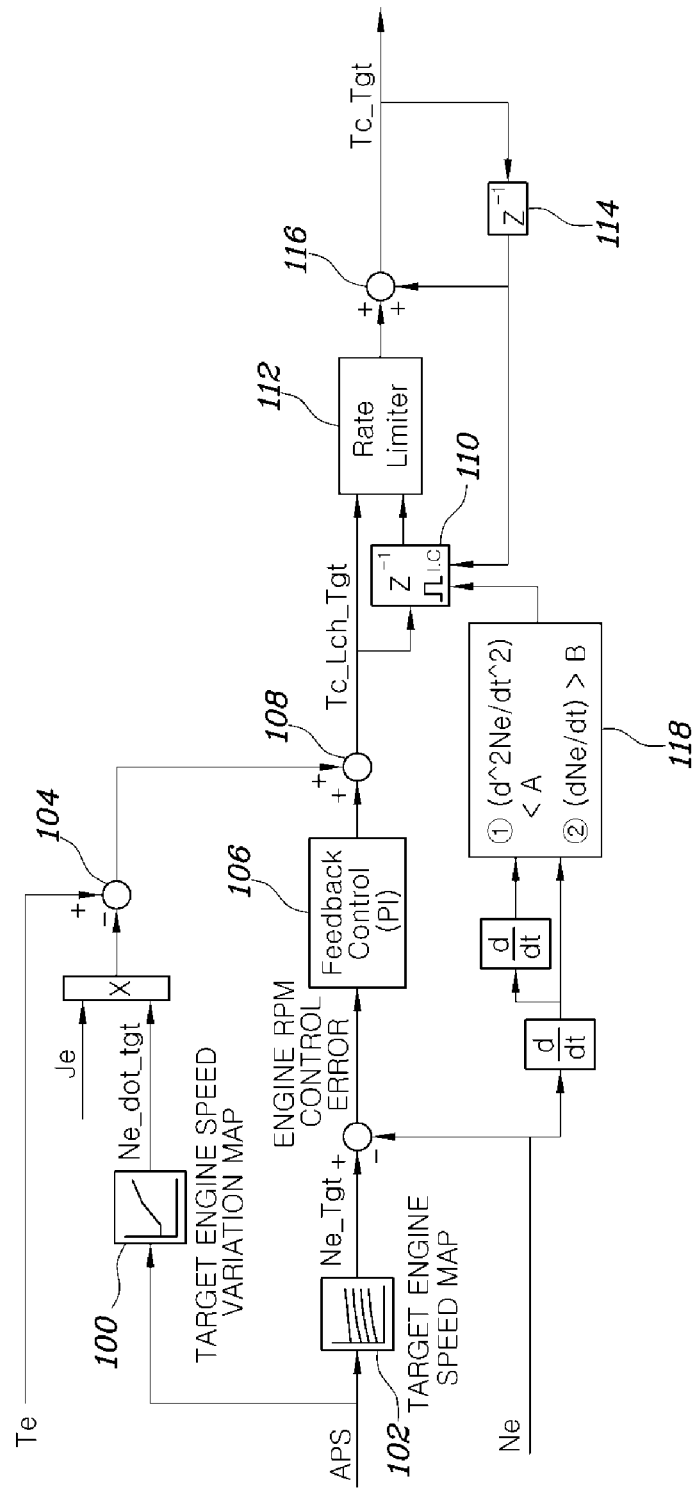
FIG. 3 is a view illustrating the configuration of a control apparatus which may implement a vehicle launch control method in accordance with the present invention.
Figure 4:
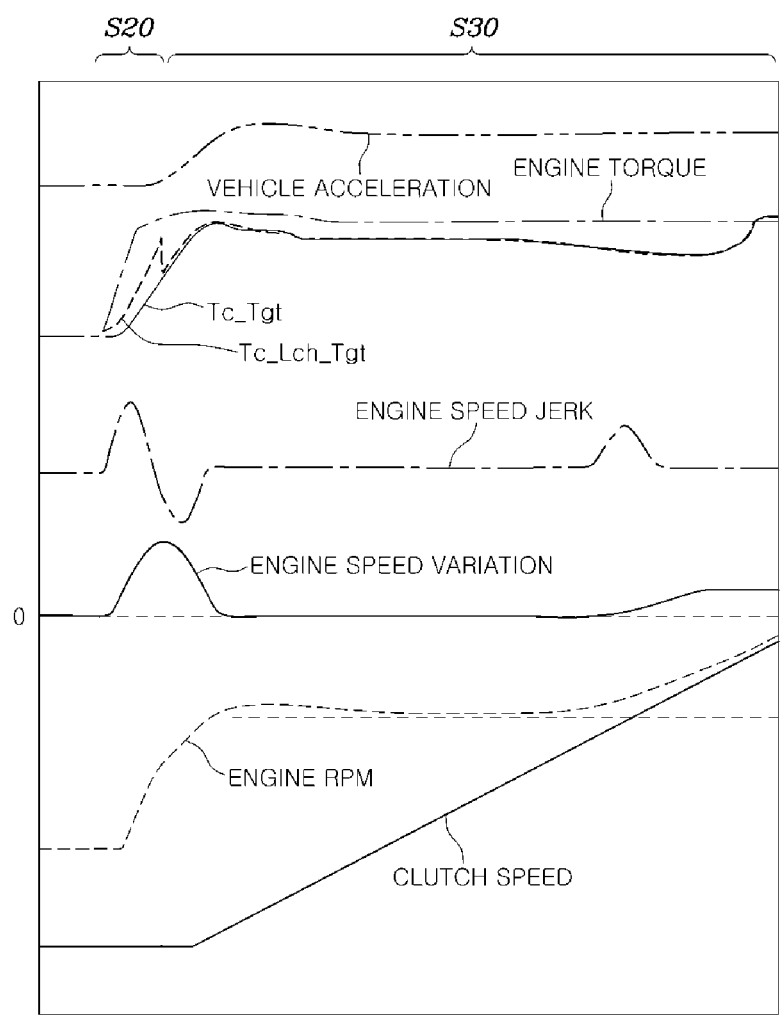
FIG. 4 is a graph illustrating change of target clutch torque according to time in the vehicle launch control method in accordance with the present invention.

FIG. 3 is a view illustrating the configuration of a control apparatus which may implement a vehicle launch control method in accordance with the present invention. The control apparatus in accordance with the present invention includes a target engine speed variation map 100 to receive the manipulated quantity of an accelerator pedal and then to output a target engine speed variation, a target engine speed map 102 to receive the manipulated quantity of the accelerator pedal and then to output a target engine speed, a feed-forward determination unit 104 to determine a feed-forward component by subtracting a value, acquired by multiplying the output value from the target engine speed variation map 100 by moment of rotational inertia of an engine driving system, from engine torque, a feedback determination unit 106 to determine a feedback component by multiplying a difference between the output value from the target engine speed map 102 and an actually measured engine speed by a gain, a launch target torque determination unit 108 to determine clutch launch target torque by adding the feed-forward component from the feed-forward determination unit 104 and the feedback component from the feedback determination unit 106, a first unit delay 110 to store a value of the clutch launch target torque in the previous control cycle, output from the launch target torque determination unit 108, the rate limiter 112 to determine a difference between the clutch launch target torque output from the launch target torque determination unit 108 and the clutch launch target torque in the previous control cycle provided by the first unit delay 110 and to output the difference restricted so as not to exceed a designated limit value, a second unit delay 114 to store target clutch torque in the previous control cycle, and a target clutch torque determination unit 116 to determine target clutch torque used in the current control cycle by adding the output value from the rate limiter 112 to the target clutch torque in the previous control cycle provided by the second unit delay 114.

Further, the control apparatus further includes a condition judgment unit 118 to output a signal to substitute the output value from the second unit delay 114 for the output value from the first unit delay 110, when an engine speed variation satisfies designated variation conditions and engine speed jerk satisfies designated jerk conditions.

The first unit delay 110 is configured to output the stored clutch launch target torque in the previous control cycle before the first unit delay 110 receives the signal from the condition judgment unit 118, and then to output the target clutch torque in the previous cycle provided by the second unit delay 115 after the first unit delay 110 receives the signal from the condition judgment unit 118.

The above-described control apparatus is operated through substantially the same method as the above-described control method and a detailed description of the function thereof will thus be omitted.

As is apparent from the above description, in a vehicle launch control method in accordance with the present invention, when a vehicle provided with a dry clutch is launched, clutch torque is properly controlled to prevent the vehicle from rattling and to smoothly launch the vehicle, improving marketability of the vehicle due to improvement in driving performance of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle launch control method comprising:
   judging, by a controller, whether or not a vehicle starts to be launched;
   determining, by the controller, target clutch torque through a designated first determination method and controlling a clutch based on the determined target clutch torque, upon judging that the vehicle starts to be launched; and
   determining, by the controller, the target clutch torque through a designated second determination method differing from the first determination method and controlling the clutch based on the determined target clutch torque through the second determination method, when an engine speed variation and engine jerk respectively satisfy designated variation conditions and jerk conditions during determination of the target clutch torque through the first determination method and control of the clutch based on the determined target clutch torque through the first determination method.

2. The vehicle launch control method according to claim 1, wherein, in the first determination method, the target clutch torque is determined using a variation of clutch launch target torque per control cycle, acquired by adding a feed-forward component, based on a target engine speed variation determined according to a manipulated quantity of an accelerator pedal by a driver, and a feedback component, based on a target engine speed determined according to the manipulated quantity of the accelerator pedal, as an increment of the target clutch torque per control cycle.

3. The vehicle launch control method according to claim 2,
   wherein the feed-forward component of the clutch launch target torque is acquired by subtracting a value, acquired by multiplying the target engine speed variation output from a target engine speed variation map, representing target engine speed variations according to manipulated quantities of the accelerator pedal by the driver, by moment of rotational inertia of an engine driving system, from engine torque; and
   wherein the feedback component of the clutch launch target torque is acquired by multiplying a difference between the target engine speed output from a target engine speed map, representing target engine speeds according to the manipulated quantities of the accelerator pedal by the driver, and a measured engine speed by a designated gain.

4. The vehicle launch control method according to claim 2, wherein the variation of the clutch launch target torque per control cycle used as the increment of the first target clutch torque per control cycle is restricted to a designated limit value.

5. The vehicle launch control method according to claim 2, wherein, in the second determination method, the target clutch torque is determined using a difference between the clutch launch target torque, determined through a same method as the first determination method, and the target clutch torque in a previous control cycle as the increment of the target clutch torque per control cycle.

6. The vehicle launch control method according to claim 1, wherein the variation conditions serving as a criterion for judgment of the engine speed variation and the jerk conditions serving as a criterion for judgment of the engine jerk are respectively set to values to judge that a transient state of an engine according to manipulation of an accelerator pedal by a driver is terminated.

7. The vehicle launch control method according to claim 1, wherein determination of the target clutch torque through the second determination method and control of the clutch based on the determined target clutch torque through the second determination method are continued until termination of launch of the vehicle is confirmed.

* * * * *